United States Patent
Sasson et al.

(10) Patent No.: US 11,029,884 B2
(45) Date of Patent: Jun. 8, 2021

(54) STORAGE HANDLING GUIDANCE FOR HOST INPUT/OUTPUT OPERATIONS

(71) Applicant: International Business Machines Corporation, Armonk, NY (US)

(72) Inventors: Ben Sasson, North Baddesley (GB); Carlos F. Fuente, Bishops Waltham (GB); Florent Rostagni, Eastleigh (GB); Alexander Henry Ainscow, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/512,449

(22) Filed: Jul. 16, 2019

(65) Prior Publication Data

US 2021/0019081 A1    Jan. 21, 2021

(51) Int. Cl.
    *G06F 3/06*    (2006.01)
    *G06F 16/901*    (2019.01)

(52) U.S. Cl.
    CPC ............ *G06F 3/0659* (2013.01); *G06F 3/061* (2013.01); *G06F 3/0608* (2013.01); *G06F 3/0643* (2013.01); *G06F 3/0653* (2013.01); *G06F 3/0673* (2013.01); *G06F 16/902* (2019.01)

(58) Field of Classification Search
    None
    See application file for complete search history.

(56) References Cited

U.S. PATENT DOCUMENTS

| | | | |
|---|---|---|---|
| 8,732,426 B2 | 5/2014 | Colgrove | |
| 9,423,967 B2 | 8/2016 | Colgrove | |
| 10,013,170 B1 | 7/2018 | Sahin | |
| 10,078,569 B1 | 9/2018 | Alshawabkeh | |
| 10,229,221 B1* | 3/2019 | Tang | G06F 12/00 |
| 2006/0236061 A1* | 10/2006 | Koclanes | G06F 3/0605 |
| | | | 711/170 |
| 2011/0137870 A1* | 6/2011 | Feder | G06F 16/174 |
| | | | 707/662 |
| 2012/0297145 A1 | 11/2012 | Castillo | |
| 2016/0359684 A1* | 12/2016 | Rizqi | G06F 3/067 |

(Continued)

OTHER PUBLICATIONS

Meng et al., "A Hint Frequency Based Approach to Enhancing the I/O Performance of Multilevel Cache Storage Systems", Journal of Computer Science and Technology 32(2): 312-328 Mar. 2017. DOI 10.1007/s11390-017-1724-0, revised Dec. 29, 2016, 17 pages.

(Continued)

*Primary Examiner* — Edward J Dudek, Jr.
*Assistant Examiner* — Ralph A Verderamo, III
(74) *Attorney, Agent, or Firm* — Christopher M. Pignato (57) ABSTRACT

Method and system are provided for storage handling guidance for host input/output (I/O) operations. The method includes: providing a guidance array of indications of storage operations handling instructions, the guidance array having multiple dimensions of performance characteristics with each dimension having multiple levels; and associating a reference vector with one or more I/O operations, wherein the reference vector points to a level for each dimension of the array to obtain an indication of a storage operations handling instruction at an intercept of the dimension levels for application by a storage system controller for the one or more I/O operations.

17 Claims, 7 Drawing Sheets

(56) References Cited

U.S. PATENT DOCUMENTS

2017/0242596 A1     8/2017  Liu
2018/0136870 A1*    5/2018  Rajani ................... G06F 3/0665
2018/0253361 A1*    9/2018  Dhatrak .............. G06F 11/1469

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

STORAGE HANDLING GUIDANCE FOR HOST INPUT/OUTPUT OPERATIONS

BACKGROUND

The present invention relates to storage handling in storage systems, and more specially to storage handling guidance for host input/output (I/O) operations.

Many storage systems implement data reduction techniques that are software technologies designed to reduce the amount of data written on the backend. Among these techniques, thin provisioning, compression and deduplication are among the most commonly used.

While these techniques achieve their goal by reducing the amount of data written on the backend, their use raises new problems, among which are data resiliency and performance. By relying on both software and metadata, these techniques lead to I/O amplification where the actual amount of information physically-written to the storage media is a multiple of the logical amount intended to be written, to more processor usage, and, for deduplication, to a dependency between volumes. The impact of these techniques can be categorized as concerning performance and as concerning data resiliency.

Concerning performance, the use of metadata leads to I/O amplification, and thus one host I/O operation results in at least two I/O operations performed on the backend; one to stage the metadata and one to perform the current I/O. Also, the metadata requires processing which consumes processor performance. Additionally, if data is or has to be compressed, the compression and decompression consume processor resources, impacting other I/Os.

Concerning data resiliency, the problem comes from corruption of the backend. If metadata is corrupt, it may result in a large portion or an entire volume being lost. If the corruption lies in compressed data, the fact that data is compressed means that more data will corrupt than if not compressed. Furthermore, if this corrupt data or metadata is accessed by other volumes via deduplication, then the corruption may be spread over all references to this data.

SUMMARY

According to an aspect of the present invention there is provided a computer-implemented method for providing storage handling guidance for host input/output (I/O) operations, carried out at a storage system and comprising: providing a guidance array of indications of storage operations handling instructions, the guidance array having multiple dimensions of performance characteristics with each dimension having multiple levels; and associating a reference vector with one or more I/O operations, wherein the reference vector points to a level for each dimension of the array to obtain an indication of a storage handling instruction at an intercept of the dimension levels for application by a storage system controller for the one or more I/O operations.

According to an aspect of the present invention there is provided a system for providing storage handling guidance for host input/output (I/O) operations, comprising: a processor and a memory configured to provide computer program instructions to the processor to execute the function of the components: a guidance array of indications of storage operations handling instructions accessible to a storage system controller, the guidance array having multiple dimensions of performance characteristics with each dimension having multiple levels; and a reference vector receiving component for receiving a reference vector associated with one or more I/O operations, wherein the reference vector points to a level for each dimension of the array to obtain an indication of a storage handling instruction at an intercept of the dimension levels for application by the storage system controller for the one or more I/O operations.

According to an aspect of the present invention there is provided a computer program product for providing storage handling guidance for host input/output (I/O) operations, the computer program product comprising a computer readable storage medium having program instructions embodied therewith, the program instructions executable by a processor to cause the processor to: provide a guidance array of indications of storage operations handling instructions, the guidance array having multiple dimensions of performance characteristics with each dimension having multiple levels; and associate a reference vector with one or more I/O operations, wherein the reference vector points to a level for each dimension of the array to obtain an indication of a storage handling instruction at an intercept of the dimension levels for application by a storage system controller for the one or more I/O operations.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system personalize the storage system actions taken for host I/O operations based on storage handling guidance, either provided by the host or computed by the storage device. The storage handling guidance is provided in the form of instructions on how to handle the I/O operation referenced from a guidance array of one or more dimensions of performance characteristics, with each dimension having multiple levels.

The storage handling guidance array may be stored within a storage system or accessed by the storage system for look-up during an I/O operation to the storage system.

The guidance array may be referenced using a vector reference for I/O operations to provide storage handling guidance to a storage system indicating required methods to handle the I/O operations. The vector reference may point to a level of each dimension in the array where appropriate instructions are provided. A storage system may look-up the array using the vector reference for an I/O operation to determine appropriate storage handling of the I/O operation.

The guidance array of storage handling guidance may be defined by host applications, storage devices, or the user A storage vendor may construct a guidance array as part of a product development cycle and may advertise it to the hosts by various means. Host applications, storage devices, or users may adapt the guidance array to suit their storage handling requirements with the possibility of adding or removing dimension levels thereby providing flexibility for adding or removing instructions. The array may be multi-dimensions of performance characteristics and each dimension may have an arbitrary number of levels, independently of the other dimensions. This results in a multi-dimension array of arbitrary size that may vary over time.

Figure 1:
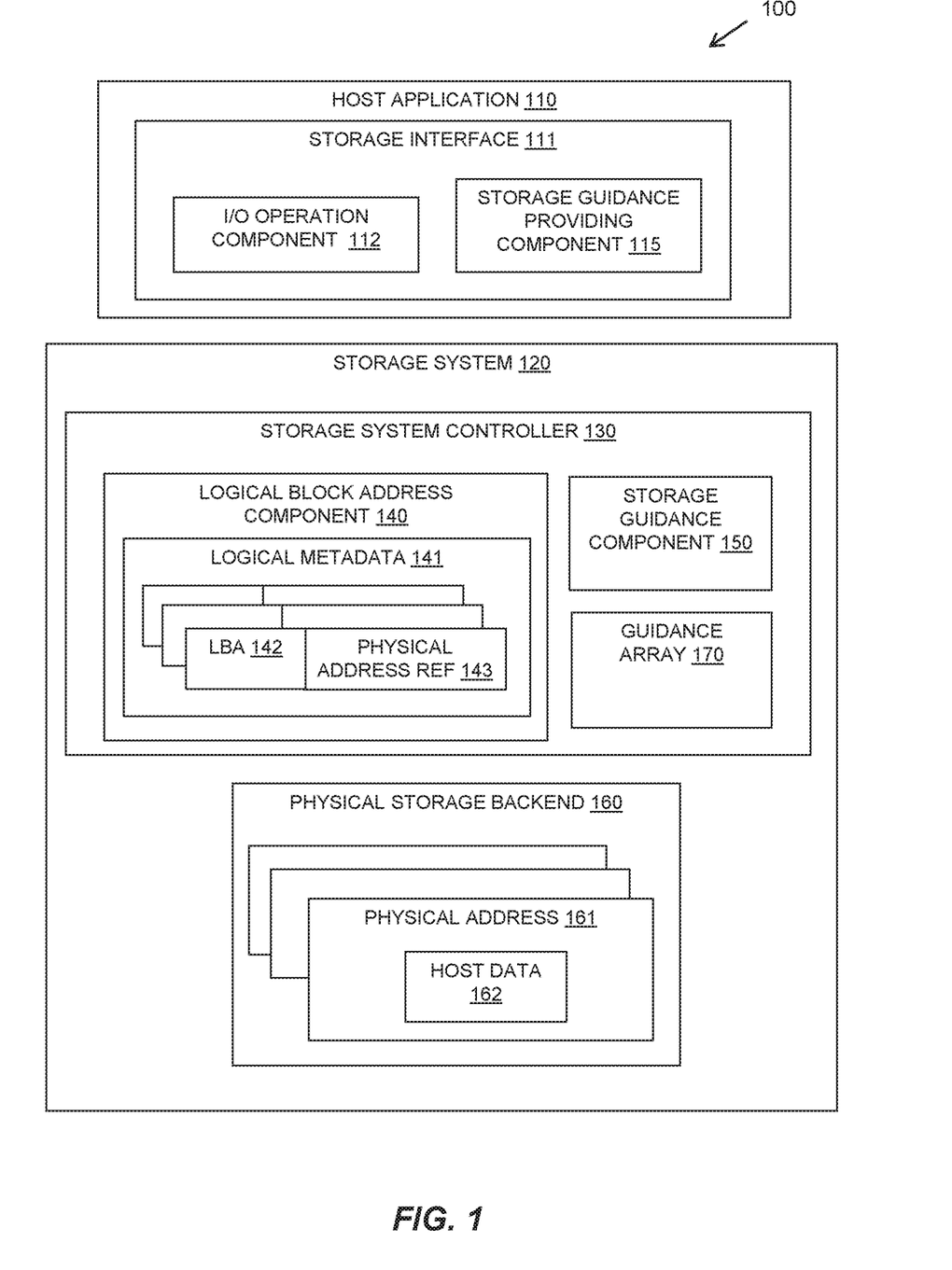
FIG. 1 is a block diagram of an example embodiment of a storage system in accordance with the present invention.

Referring to FIG. 1, an example embodiment of a system 100 including a storage system 120 is shown. The storage system 120 provides storage for a host application 110 at a host server having a storage interface 111 through which I/O operations 112 are handled for writing and reading data to and from the storage system 100.

The storage system 120 includes a storage system controller 130 and a physical storage backend 160. The physical storage backend 160 provides physical disk storage across an array of physical devices of non-volatile storage media. The physical storage backend 160 has physical addresses 161 at which logical units of host data 162 are stored and referenced by logical block addresses (LBAs) 142.

The storage system controller 130 may provide a logical block address component 140 for maintaining a virtual domain in which logical metadata 141 is maintained of LBAs 142 which are mapped to references 143 of physical addresses at which the host data 162 is stored at a physical storage backend 160.

In such storage systems 120, each write to the same LBA 142 in the virtual domain may be performed at different physical addresses 161 on the physical storage backend 160. As garbage collection is carried out at the physical storage backend 160, physical addresses 161 are reused for more recent writes by other LBAs 142.

The storage system controller 130 in the described system includes a storage guidance component 150 for referencing a guidance array 170 stored or accessed by the storage system controller 130. The guidance array 170 is a multi-dimensional reference structure with each dimension relating to a performance characteristic and each dimension having multiple levels. The guidance array 170 is referenced by a reference vector that points to a level in each dimension resulting in an indication of storage operations handling instructions for the intercept of the reference vector in the guidance array 170.

The storage guidance component 150 references the guidance array 170 when receiving and handling I/O operations from a host application 110. The host application's 110 storage interface 111 includes a storage guidance providing component 115 that provides a reference vector in association with I/O operations sent by the host application 110 to the storage system controller 130 for look-up by the storage guidance component 150 of the storage system controller 130 in the guidance array 170 when processing the I/O component.

Figure 2A:
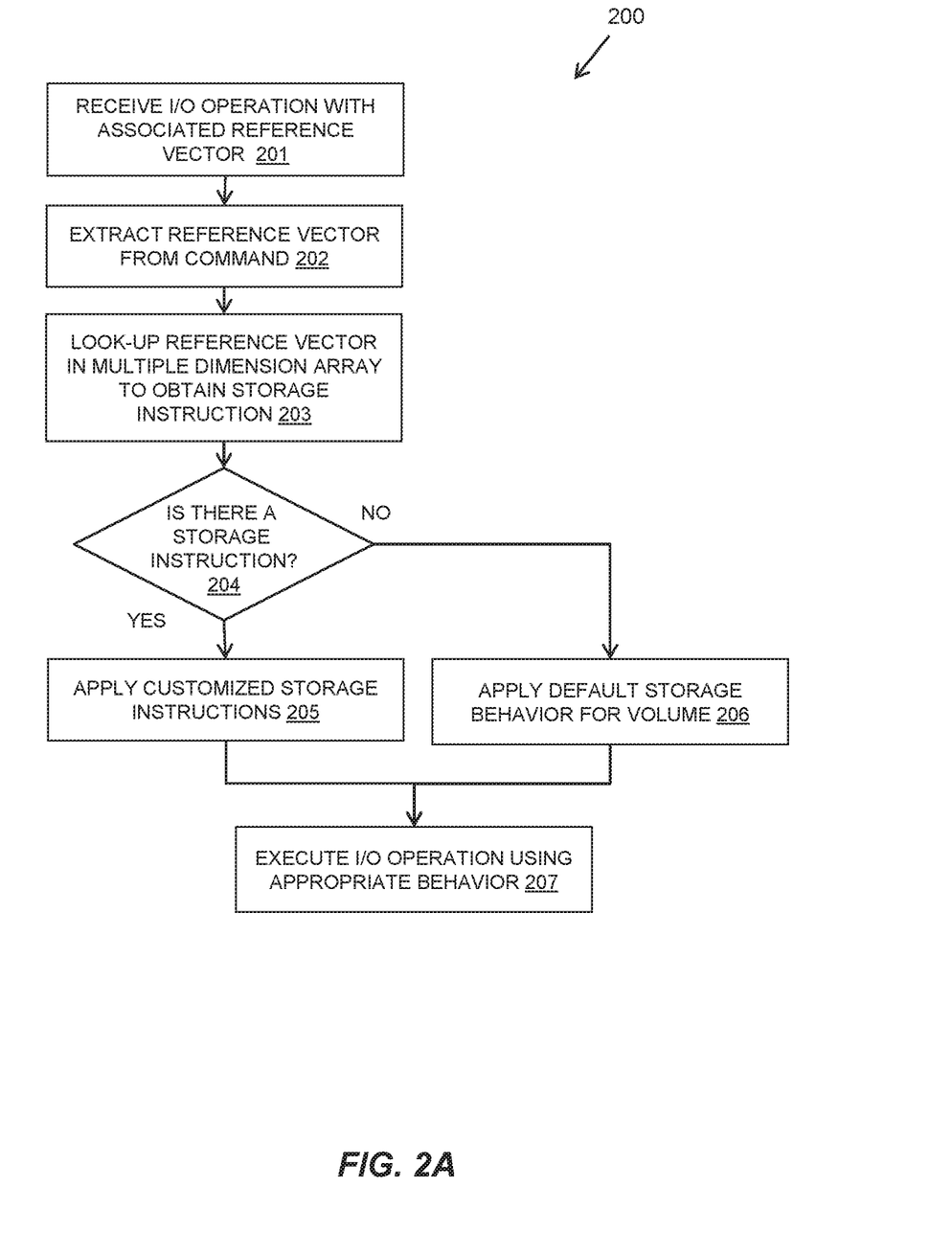
FIG. 2A is a flow diagram of an example embodiment of an aspect of a method in accordance with the present invention.

Referring to FIG. 2A, a flow diagram 200 shows an example embodiment of an aspect of the described method as carried out by a storage system controller when receiving an I/O operation.

The method may receive 201 an I/O operation with an associated reference vector. The associated reference vector may have been provided by a host application as described further below or may be applied at the storage system.

The method may extract 202 the reference vector from the command and may look-up 203 the reference vector in the multi-dimensional guidance array. The reference vector may provide a value for each dimension of the guidance array that points to a level in the dimension. The intercept of the reference vector values is a field of the guidance vector in which an indication may be provided of storage operations handling instructions. The indication may itself be a reference to a list of storage operations handling instructions or the instruction itself. In some fields of the guidance array, there may be no indication or a default indication that requires no special behavior.

The method may determine 204 if there is a storage instruction in the guidance array field referenced by the reference vector. If so, the method may apply 205 the customized storage operations handling instructions. If not, the method may apply 206 default storage handling behavior for the storage volume. The I/O operation may then be executed 207 with appropriate storage handling behavior.

Figure 2B:
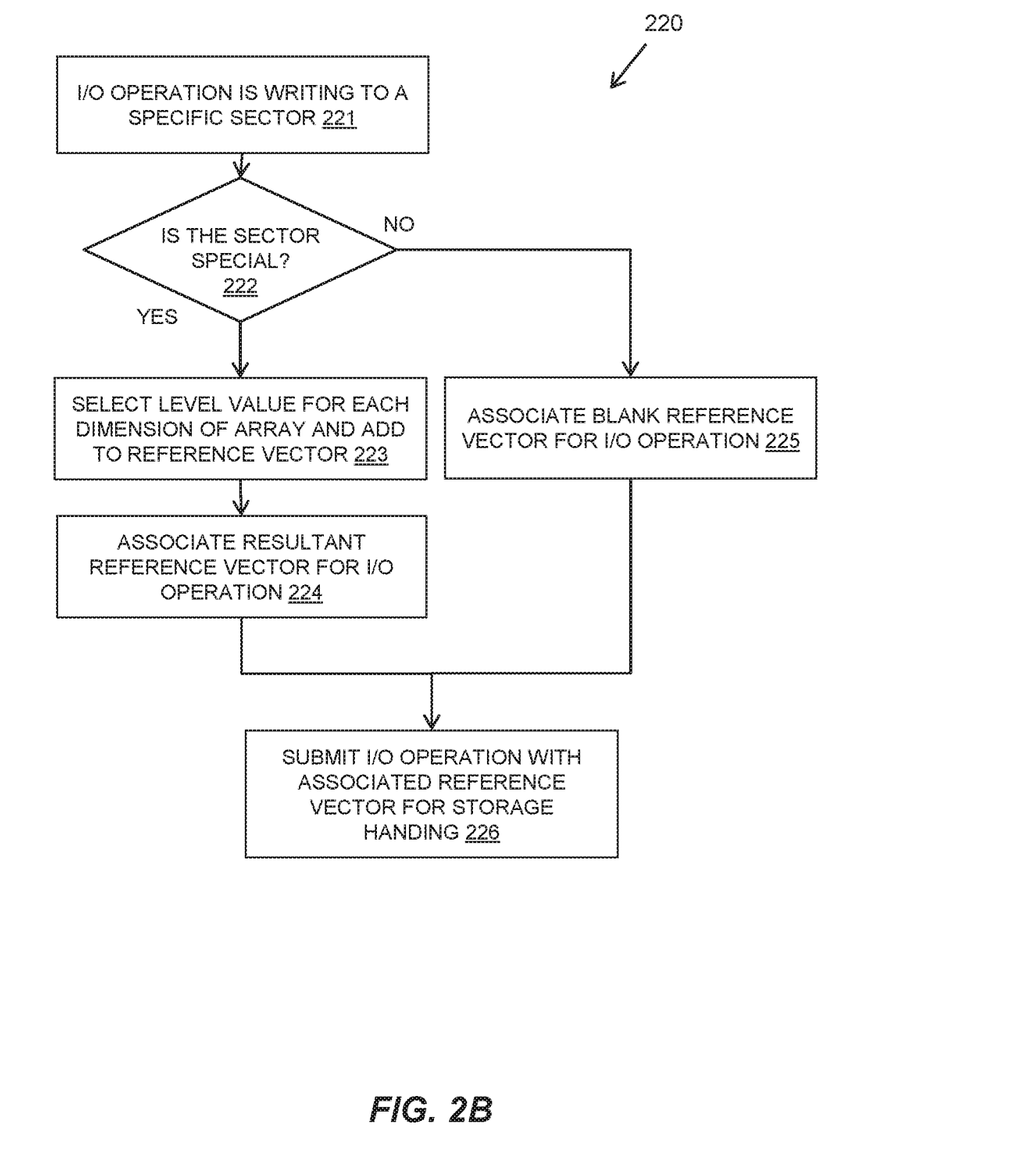
FIG. 2B is a flow diagram of an example embodiment of another aspect of a method in accordance with the present invention.

Referring to FIG. 2B, a flow diagram 220 shows an example embodiment of an aspect of the described method as carried out by a host application or a storage controller to designate a reference vector.

The dimensions, levels, and instructions of a guidance array may be defined by an agreement between the host application and the storage system. Alternatively, the guidance array may be provided within the storage system and without the awareness of a host application. Changes to the guidance array change the resulting storage behavior.

The method may be carried out by a host application when writing an I/O operation to a storage system when the guidance array is known to the host application. Alternatively, the storage system controller may receive an I/O operation from a host application and may apply a reference vector itself based on the nature or type of the incoming I/O operation.

An I/O operation may be writing 221 to a sector in the form of an address being written to by the host. A group of I/O operations may be handled together if they require the same storage handling.

It may be determined 222 if the sector being written to requires special storage handling. For example, types of sectors may include, but are not limited to: a superblock, a log area, a heartbeat sector or generic application of file system writes. All such sectors have different characteristics and optimal expected behavior from the host perspective. If no special handling is required, a blank reference vector may be associated 225 with the I/O operation. If special handling is required, a level value may be selected 223 for each dimension of the guidance array and the level value is added to the reference vector. This will point to an indication of an instruction in the guidance array for handling the combination of performance characteristic levels. The resultant reference vector is associated 224 with the I/O operation.

The method may submit 226 the I/O operation with the associated reference vector for storage handling. The I/O operation may then be handled as described in relation to FIG. 2A.

For simplicity of description, an example three-dimension array is described with dimensions or characteristics of performance, resilience, and space efficiency. Performance may be defined as the capacity, throughput and utilization of storage. Resilience may be defined as the availability of data. Space efficiency may be defined as the ability to store and manage data that consumes a least amount of space. Each dimension, in this example, has three levels: low, medium, and high.

Table 1 below shows a layer of the array for performance (with three levels shown as columns) vs resilience (with three levels shown as rows) for the level of low storage efficiency:

|  | PERFORMANCE | | |
|---|---|---|---|
| RESILIENCE | LOW | MEDIUM | HIGH |
| LOW | Lowest tier storage | Default | Highest tier storage |
| MEDIUM | Default | Default | Highest tier storage |
| HIGH | Most resilient tier Store two copies | Most resilient tier Store two copies | Highest tier storage Store two copies |

Table 2 below shows a layer of the array for performance (with three levels shown as columns) vs resilience (with three levels shown as rows) for the level of medium storage efficiency:

|  | PERFORMANCE | | |
|---|---|---|---|
| RESILIENCE | LOW | MEDIUM | HIGH |
| LOW | Lowest tier storage | Default | Highest tier storage SE not compress |
| MEDIUM | Default | Default | Highest tier storage SE not compress |
| HIGH | Most resilient tier Store two copies | Most resilient tier Store two copies | Highest tier storage Store two copies |

Table 3 below shows a layer of the array for performance (with three levels shown as columns) vs resilience (with three levels shown as rows) for the level of high storage efficiency:

|  | PERFORMANCE | | |
|---|---|---|---|
| RESILIENCE | LOW | MEDIUM | HIGH |
| LOW | Lowest tier storage Compress | Compress | Use compressing backend |
| MEDIUM | Compress | Compress | Use compressing backend |
| HIGH | Most resilient tier Store two copies Compress | Most resilient tier Store two copies Compress | Use compressing backend Store two copies |

Based on the look-up in the array, the storage system can decide on appropriate actions including one or more of:
To deduplicate or compress the data;
To store the data in a special location or even duplicate it for increased resilience;
To decide on a storage tier; and
To decide on a compression level.

The result will be that I/O operations will be handled by the storage system in a different way, depending on the guidance of the instructions in the guidance array. Where no specific handling is required, a "Default" instruction may be provided in the guidance array.

For example:

A file system superblock write may be marked as [performance=high, resiliency=high, SE=low] resulting in an instruction that it should be stored twice on the highest tier.

A generic file system write may be marked as [performance=medium, resiliency=medium, SE=high] resulting in an instruction that it should be compressed.

A file system garbage collection activity may be marked as [performance=low, resiliency=medium, SE=high] again resulting in an instruction that it should be compressed.

A host application can control or steer the behavior of individual I/O operations on the storage device, based on the actual significance and requirements of the application using the data. Overall system behavior under both normal conditions and disaster recovery is thereby improved resulting in customer benefit.

Figure 3:
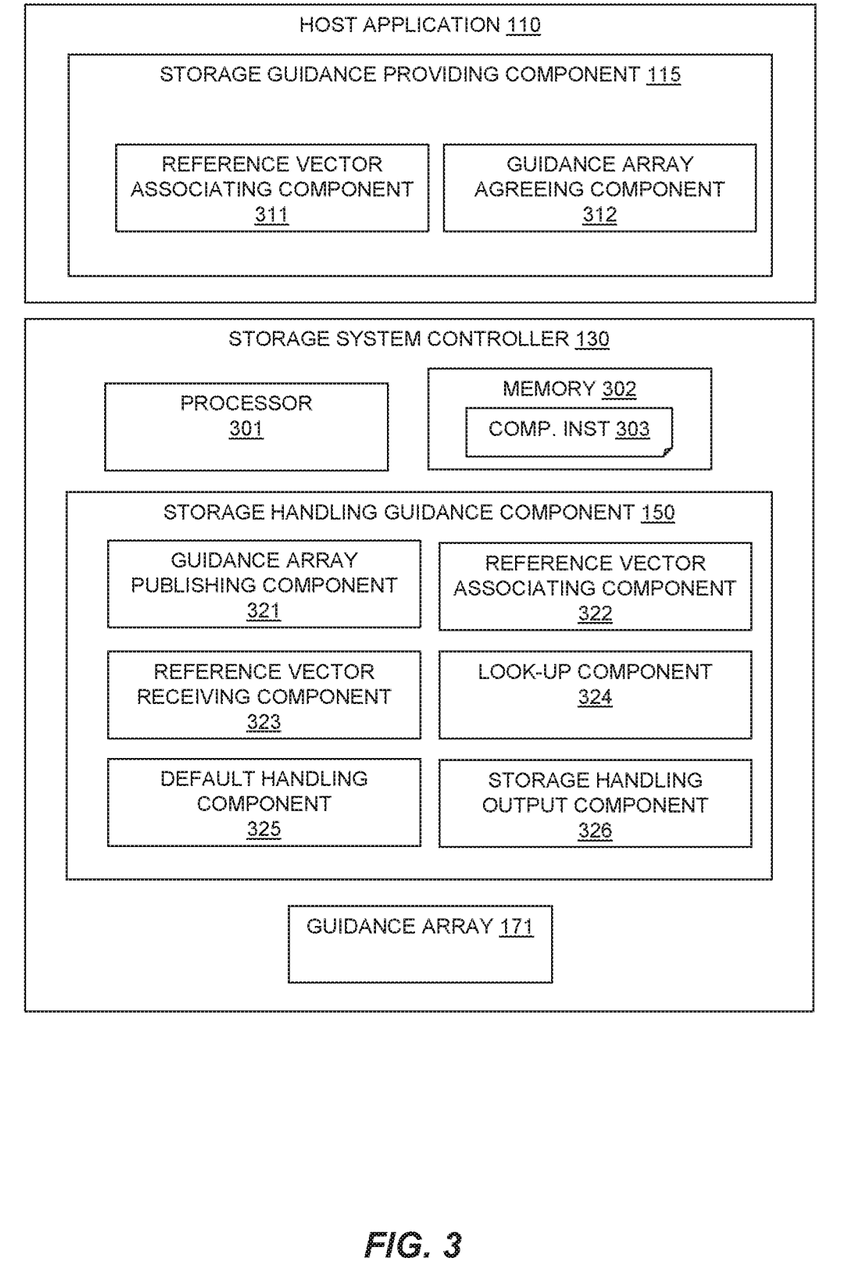
FIG. 3 is block diagram of an example embodiment of a system in accordance with the present invention.

Referring to FIG. 3, a block diagram shows a host application 110 and storage system controller 130, for example, of the system of FIG. 1, with a guidance array 171 that may be provided at the storage system or may be remotely accessible from another location.

The storage system controller 130 includes at least one processor 301, a hardware module, or a circuit for executing the functions of the described components which may be software units executing on the at least one processor 301. Multiple processors (not shown) running parallel processing threads may be provided enabling parallel processing of some or all of the functions of the components. Memory 302 may be configured to provide computer instructions 303 to the at least one processor 301 to carry out the functionality of the described components.

The storage system controller 130 includes a storage handling guidance component 150 that uses the guidance array 171 to obtain instructions for storage handling of incoming I/O operations at the storage system controller 130.

In one embodiment, a host application 110 may have a storage guidance providing component 115 including a guidance array agreeing component 312 that may agree to reference a given guidance array 171 provided by a storage system controller's 130 guidance array publishing component 321. The guidance array agreeing component 312 may receive details of updates to the guidance array 171. The storage guidance providing component 115 may include a reference vector associating component 311 for generating a reference vector of an I/O operation being sent to the storage system. The reference vector may be based on a sector of the I/O operations and may specify a required level for each dimension of the guidance array 171.

In another embodiment, the referencing vector for an I/O operation may be applied at the storage system controller 130. The storage handling guidance component 150 at the storage system controller 130 may include a reference vector associating component 322 for associating a reference vector with incoming I/O operations.

In both cases, the storage handling guidance component 150 of the storage system controller 130 may include a reference vector receiving component 323 for extracting the reference vector associated with an I/O operation, and a look-up component 324 for looking-up the reference vector in the guidance array 171 to extract the appropriate instruction for storage handling of the I/O operation. If there is no specific instruction for the reference vector in the guidance array 171, a default handling component 325 may apply a default handling for the I/O operation.

The storage handling guidance component 150 of the storage system controller 130 may include a storage handling output component 326 for outputting the required storage handling to be processed by the storage system controller 130 when storing the I/O operation.

Figure 4:
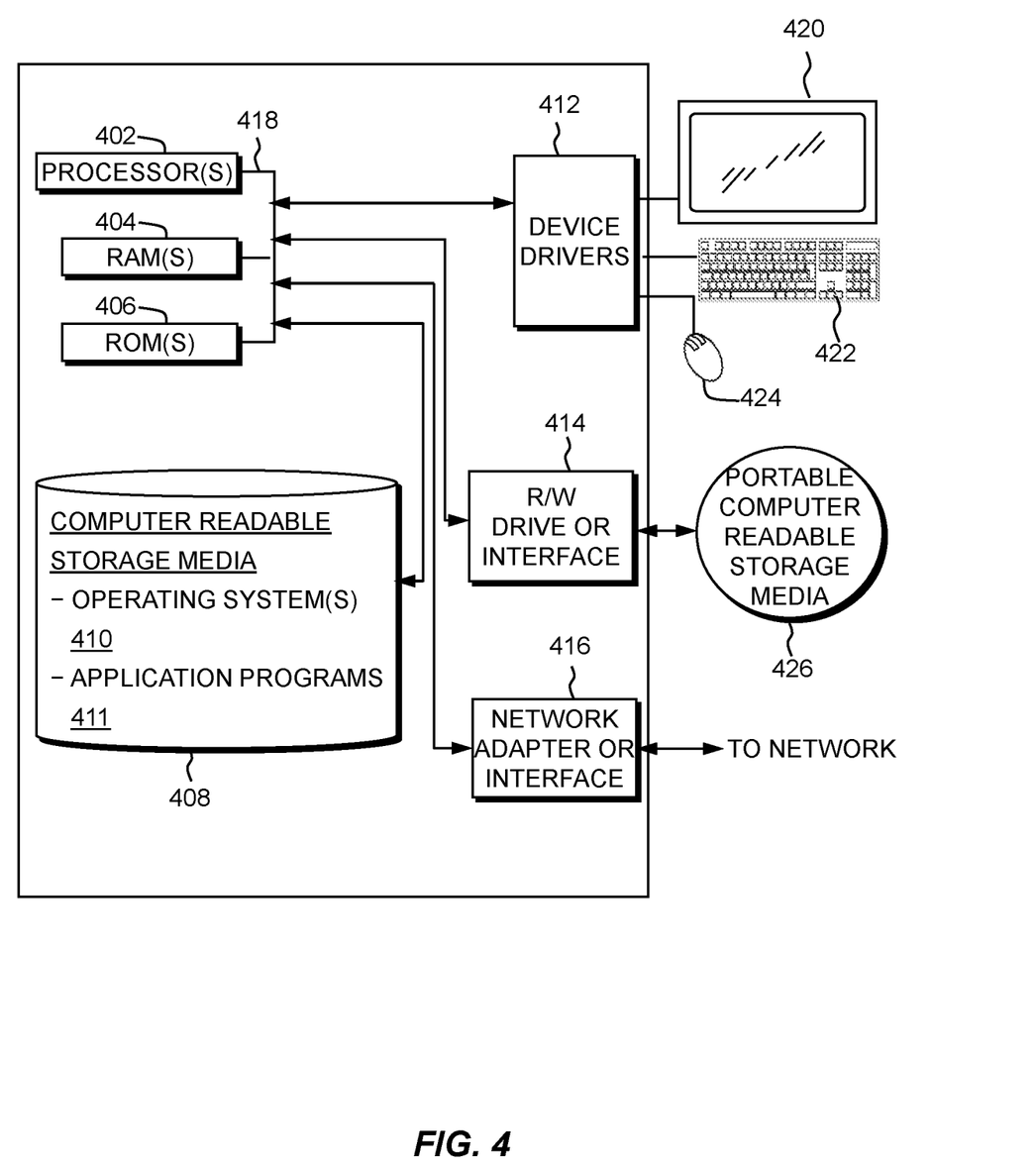
FIG. 4 is a block diagram of an embodiment of a computer system or cloud server in which the present invention may be implemented.

FIG. 4 depicts a block diagram of components of a computing device of the storage system controller 130 of the system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the storage handling guidance component 150 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 414 to read from and write to one or more portable computer readable storage media 426. Application programs 411 on computing device can be stored on one or more of the portable computer readable storage media 426, read via the respective R/W drive or interface 414 and loaded into the respective computer readable storage media 408.

Computing device can also include a network adapter or interface 416, such as a TCP/IP adapter card or wireless communication adapter. Application programs 411 on computing device can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
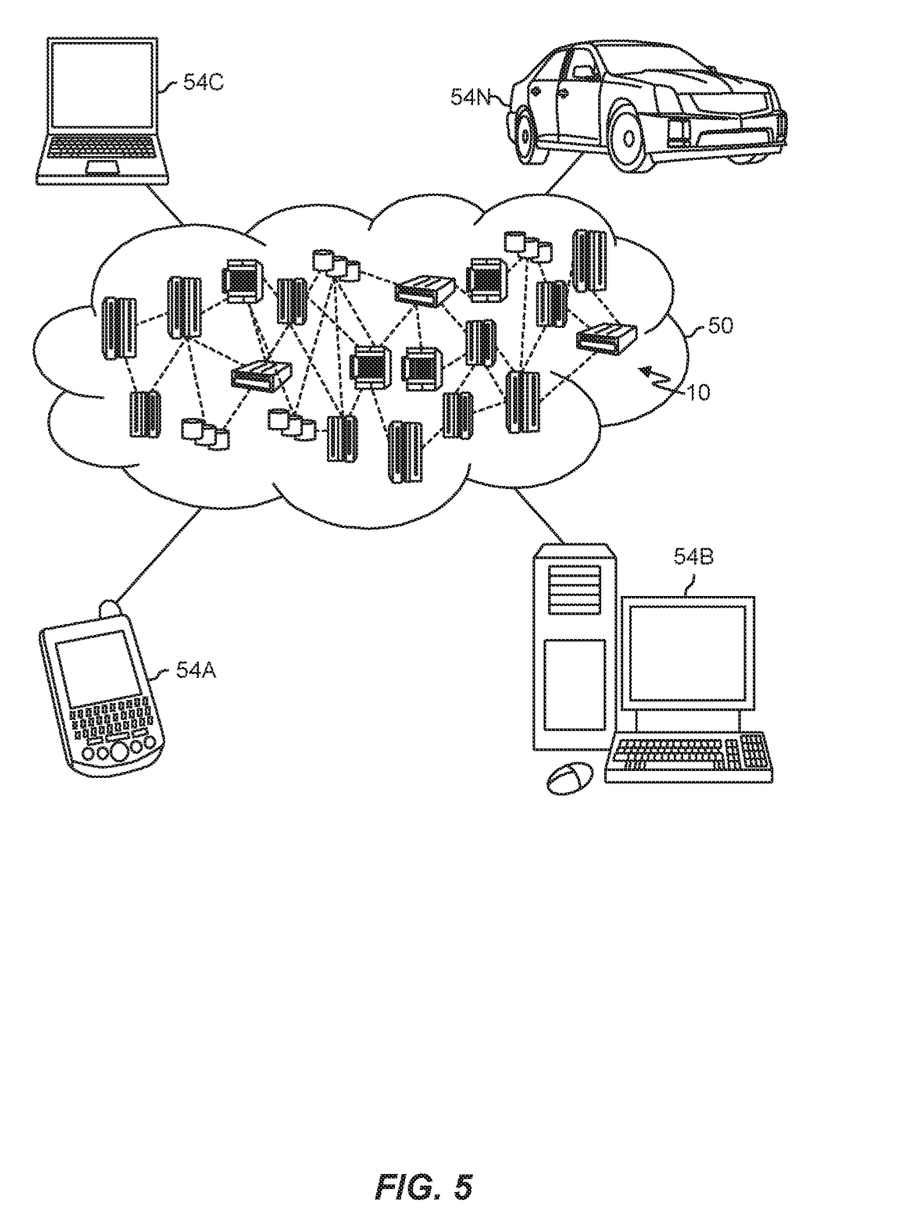
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
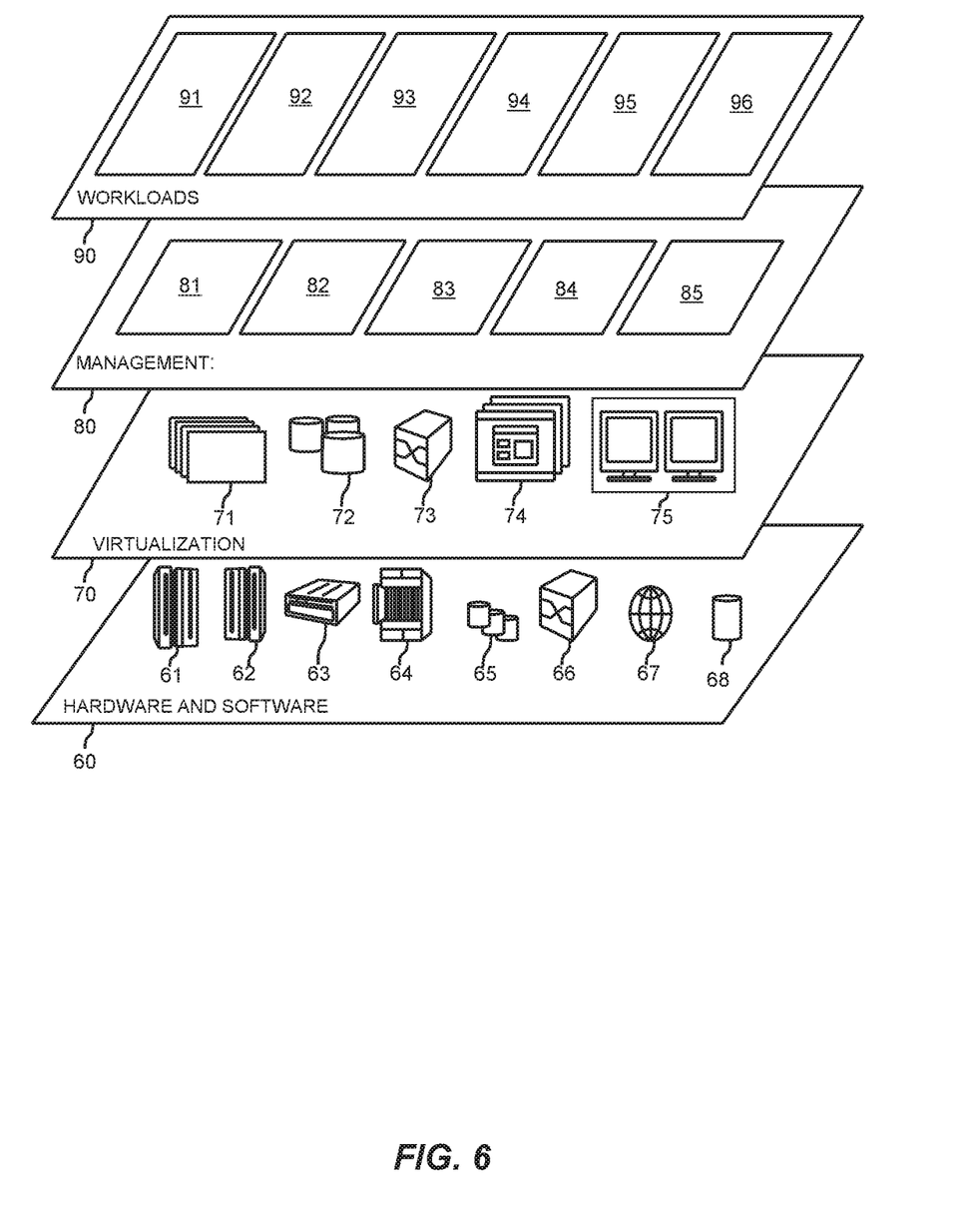
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage handling guidance processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for providing storage handling guidance for host input/output (I/O) operations comprising:

providing a guidance array of indications of storage operations handling instructions, the guidance array having multiple dimensions of performance characteristics with each dimension having multiple levels;

receiving, by a storage system controller, an input/output (I/O) operation from a host application, the I/O operation comprising a command and a reference vector, wherein the reference vector points to a level for each dimension of the guidance array to obtain an indication of a storage operations handling instruction at an intercept of the dimension levels for the host application by the storage system controller for the I/O operation;

extracting, by the storage system controller, the reference vector from the command;

looking up, by the storage system controller, the reference vector in the guidance array for the storage operations handling instruction;

determining, by the storage system controller, whether there is a customized storage operations handling instructions for the I/O operation within the guidance array, and where the customized storage operations handling instructions are present in the guidance array, applying, by the storage system controller, the customized storage operations handling instructions, otherwise, applying, by the storage system controller, default storage handling behavior;

selecting, by the storage system controller, a level value for each dimension of the guidance array;

adding each level value to the reference vector, wherein the level value added to the reference vector points to an indication of an instruction in the guidance array for handling a combination of performance characteristic.

2. The method as claimed in claim 1, further comprising: associating the reference vector with one or more I/O operations and associating is carried out by the host application in accordance with the guidance array defined by an agreement between the host application and a storage system.

3. The method as claimed in claim 1, further comprising: associating the reference vector with one or more I/O operations is carried out by the storage system controller and applying the reference vector based on a nature or type of incoming I/O operation.

4. The method as claimed in claim 3, wherein associating the reference vector with one or more I/O operations is based on a sector of the I/O operations and specifies a required level for each dimension of the guidance array.

5. The method as claimed in claim 1, further comprising: determining whether a sector being written by the I/O operation requires special storage handling; and upon determining that special storage handling is required, selecting the level value for each dimension of the guidance array and adding the level value to the reference vector, indicating an instruction in the guidance array for handling a combination of performance characteristic levels; and upon determining that special storage handling is not required, associating a blank reference vector with the I/O operation.

6. The method as claimed in claim 5, wherein the sector being written by the I/O operation that requires the special storage handling is a superblock or a log area.

7. The method as claimed in claim 1, wherein the guidance array includes dimensions for performance, resilience, and storage efficiency.

8. The method as claimed in claim 1, wherein the storage operations handling instructions are selected from the group consisting of instructions to deduplicate stored data, to compress stored data, to store data in a special location, to duplicate data for increased resilience, to decide on a storage tier, to decide on a compression level, and to handle storage operations in a designated manner.

9. A system for providing storage handling guidance for host input/output (I/O) operations, comprising:

a processor;

and a computer-readable storage media coupled to the processor, wherein the computer-readable storage media contains computer program instructions executing a computer-implemented method comprising:

providing a guidance array of indications of storage operations handling instructions accessible to a storage system controller, the guidance array having multiple dimensions of performance characteristics with each dimension having multiple levels;

receiving, by a storage system controller, an input/output (I/O) operation from a host application, the I/O operation comprising a command and a reference vector, wherein the reference vector points to a level for each dimension of the guidance array to obtain an indication of a storage operations handling instruction at an intercept of the dimension levels for the host application by the storage system controller for the I/O operation;

extracting, by the storage system controller, the reference vector from the command;

looking up, by the storage system controller, the reference vector in the guidance array for the storage operations handling instruction; and determining, by the storage system controller, whether there is a customized storage operations handling instructions for the I/O operation within the guidance array, and if the customized storage operations handling instructions are present in the guidance array, applying, by the storage system controller, the customized storage operations handling instructions, otherwise, applying, by the storage system controller, default storage handling behavior;

selecting, by the storage system controller, a level value for each dimension of the guidance array; and adding each level value to the reference vector, wherein the level value added to the reference vector points to an indication of an instruction in the guidance array for handling a combination of performance characteristic.

10. The system as claimed in claim 9, further comprising: associating the reference vector with one or more I/O operations and the associating of the reference vector with the one or more I/O operations is carried out by the host application in accordance with the guidance array as defined by an agreement between the host application and a storage system.

11. The system as claimed in claim 10, wherein associating the reference vector with one or more I/O operations is based on a sector of the I/O operations and specifies a required level for each dimension of the guidance array.

12. The system as claimed in claim 9, further comprising:
    determining whether a sector being written by the I/O operation requires special storage handling;
    upon determining that special storage handling is required, selecting the level value for each dimension of the guidance array and adding the level value to the reference vector, indicating an instruction in the guidance array for handling a combination of performance characteristic levels; and
    upon determining that special storage handling is not required, associating a blank reference vector with the I/O operation.

13. The system as claimed in claim 12, wherein the sector being written by the I/O operation that requires the special storage handling is a superblock or a log area.

14. The system as claimed in claim 9, wherein the guidance array includes dimensions for performance, resilience, and storage efficiency.

15. The system as claimed in claim 9, wherein the storage operations handling instructions are selected from the group consisting of instructions to deduplicate stored data, to compress stored data, to store data in a special location, to duplicate data for increased resilience, to decide on a storage tier, to decide on a compression level, and to handle storage operations in a designated manner.

16. A computer program product for providing storage handling guidance for host input/output (I/O) operations, the computer program product comprising:
    a computer readable storage medium having program instructions embodied therewith, the program instructions executable by a processor to cause the processor to:
        provide a guidance array of indications of storage operations handling instructions, the guidance array having multiple dimensions of performance characteristics with each dimension having multiple levels;
        receive, by a storage system controller, an input/output (I/O) operation from a host application, the I/O operation comprising a command and a reference vector, wherein the reference vector points to a level for each dimension of the guidance array to obtain an indication of a storage operations handling instruction at an intercept of the dimension levels for application by the storage system controller for the one or more I/O operations;
        extract, by the storage system controller, the reference vector from the command;
        look up, by the storage system controller, the reference vector in the guidance array for the storage operations handling instruction;
        determine, by the storage system controller, whether there is a customized storage operations handling instructions for the I/O operation within the guidance array, and where the customized storage operations handling instructions are present in the guidance array, applying, by the storage system controller, the customized storage operations handling instructions, otherwise, applying, by the storage system controller, default storage handling behavior;
        select, by the storage system controller, a level value for each dimension of the guidance array; and
        add each level value to the reference vector, wherein the level value added to the reference vector points to an indication of an instruction in the guidance array for handling a combination of performance characteristic.

17. The computer program product of claim 16, further comprising instructions to:
    determine whether a sector being written by the I/O operation requires special storage;
    upon determining that special storage handling is required, select the level value for each dimension of the guidance array and adding the level value to the reference vector, indicating an instruction in the guidance array for handling a combination of performance characteristic levels; and
    upon determining that special storage handling is not required, associate a blank reference vector with the I/O operation.

* * * * *